United States Patent
Hobson et al.

[11] Patent Number: 6,160,328
[45] Date of Patent: Dec. 12, 2000

[54] ELECTRIC MOTOR

[75] Inventors: Barry Reginald Hobson, North Lake; Christopher Paull Revill, Warwick; Angelo Paoliello, Sawyer Valley, all of Australia; Eric Roberts Laithwaite, deceased, late of Surrey, United Kingdom, by David William Bagnall, legal representative

[73] Assignee: Merlex Corporation PTY Ltd., Highgate, Australia

[21] Appl. No.: 09/196,274

[22] Filed: Nov. 19, 1998

[30] Foreign Application Priority Data

Nov. 13, 1998 [AU] Australia ................ PP7124

[51] Int. Cl.[7] .................................................. H02K 7/065
[52] U.S. Cl. ............................................................ 310/20
[58] Field of Search ................................. 310/20, 37, 80, 310/91, 12

[56] References Cited

U.S. PATENT DOCUMENTS

| | | | |
|---|---|---|---|
| 3,967,146 | 6/1976 | Howard | 310/80 |
| 4,620,252 | 10/1986 | Bauck et al. | 310/36 X |
| 4,764,695 | 8/1988 | Inoue et al. | 310/20 |
| 4,864,276 | 9/1989 | Tribbey et al. | 340/407 |
| 5,036,239 | 7/1991 | Yamaguchi | 310/81 X |
| 5,471,103 | 11/1995 | Fujii | 310/81 |
| 5,793,133 | 8/1998 | Shiraki et al. | 310/81 |

*Primary Examiner*—Nestor Ramirez
*Assistant Examiner*—Judson H. Jones
*Attorney, Agent, or Firm*—Rader, Fishman, Grauer & McGarry, an Office of Rader, Fishman & Grauer PLLC

[57] ABSTRACT

An electric motor $10_{vi}$ includes a Cockcroft ring 12 for producing a magnetic field having lines of flux extending in the first direction through an air gap 18. A disc 14 capable of at least two dimensional motion in a plane relative to the Cockcroft ring 12 provides a plurality of conductive paths $C_A$–$C_E$. Each path $C_A$–$C_E$ has a segment $16_A$–$16_E$ respectively that extends through the magnetic field in a second direction so that interaction with an electric current passing through a particular segment $16_A$–$16_E$, produces a thrust force acting on the disc 14 via that segment $16_A$–$16_E$. A multi phase toroid shaped transformer 40 induces electric currents to flow in the paths $C_A$–$C_E$ and thus through the corresponding segments $16_A$–$16_E$. One of the segments, for example $16_A$ is located relative to a second segment for example $16_E$, so that their respective thrust forces do not lie in the same axis. This ensures that the thrust forces produced are able to provide the two dimensional motion in a plane. The direction and magnitude of the respective thrust forces and thus the motion of the disc 14 relative to the Cockcroft ring 12 can be controlled by varying the magnitude and/or phase relationship of the electric currents flowing through the segments $16_A$–$16_E$.

7 Claims, 8 Drawing Sheets

ELECTRIC MOTOR

BACKGROUND OF THE INVENTION

This application claims the benefit of Australian Provisional Application filed on Nov. 13, 1998.

1. Field of the Invention

The applicant is knowledgeable of the design and operation pulverizing mills used to grind mineral samples into a fine powder. The pulverizing mill together with many other types of machines require an orbital or vibratory motion in order to work. These machines include for example screens for screening particles, cone crushers for crushing rocks, and shakers and stirrers for shaking and stirring laboratory solutions, biological/medical products and specifications, and the like.

2. Related Art

Traditionally, the orbital or vibratory motion required on such machines is imparted to an object by attaching the object: to a spring mounted platform to which is coupled an eccentrically weighted shaft driven by a motor: or, via bearings to an eccentric shaft driven by a motor. A mechanical coupling such as a gear box, belt, or universal joint is used to couple the output of the motor to the shaft.

However, the very motion that these machines are designed to produce also leads to their inevitable and frequent failure. Specifically, the required orbital or vibratory motion leads to fatigue failure in various components of the machines including mechanical couplings, transmissions, bearings, framework and mounts. The cost of repairing such failures is very high. In addition to the cost of repairing the broken component(s) substantial loses can be incurred due to down time in a larger process in which the failed machine performs one or more steps. A further limitation of such machines is that they produce fixed orbits or motions with no means of dynamic control (i.e. no means of varying orbit path while machine is running).

The present invention has evolved from the perceived need to be able to (generate orbital or vibratory motion without the limitations and deficiencies of the above described prior art.

SUMMARY OF THE INVENTION

According to the present invention there is provided an electric motor including:

a magnetic field means for producing a magnetic field having lines of flux extending in a first direction;

a support capable of at least two dimensional motion in a plane relative to the magnetic field means and provided with a minimum of two electrically conductive paths, each path having a segment that extends through the magnetic field in a second direction so that interaction of an electric current flowing through a particular segment and the magnetic field produces a thrust force acting on the support via that segment;

10 a first one of said segments located relative to a second one of said segments so that their respective thrust forces do not lie on the same axis; wherein the direction and magnitude of the respective thrust forces and thus the motion of the support relative to the magnetic field means can be controlled by varying the magnitude and/or phase relationship of electric currents flowing through the segments.

Preferably the support is made of an electrically conductive material and is provided with a plurality of apertures disposed inboard of an outer peripheral edge of the support wherein the electrically conductive paths are constituted by the portions of the support that extend about the apertures.

Preferably the support is in the form of a wheel having, a central hub, spokes extending radially outwardly from the hub and an outer rim joining the spokes, wherein each aperture is defined by the space formed between adjacent spokes and sectors of the hub and rim between which adjacent spokes extend, and each conductive path comprises a pair of adjacent spokes and the sectors of the hub and rim between which the pair of adjacent spokes extend so that adjacent conductive paths share a common spoke.

Preferably, the electric motor further includes induction means for inducing an electric current to flow through the electrically conductive paths.

Preferably, induction means is supported separately from the support.

Preferably the inductions means comprises a plurality of transformers each having a primary coil and a core about which the primary coil winds, and wherein the core of each transformer interlinks with adjacent apertures so that an electric current flow in the primary coil of a transformer can induce an electric current to flow the electrically conductive paths about the corresponding adjacent apertures.

Preferably in an alternate embodiment the induction means includes:

a transformer having a core formed into a closed loop and provided with a plurality of windows through which respective spokes of the support pass, 1.0 each windows bound by opposed branches of the core that extend in the same plane as the support and opposed pairs of legs of the core that extend in a plane perpendicular to the support; and a plurality of primary coils, a primary coil wound about at least one of the branches of the core of each window;

whereby in use, when an alternating current is caused to flow through the primary coils lines of magnetic flux are created that circulate about the windows in the core, the majority of the flux being shared in legs of the core between adjacent windows, and wherein said lines of magnetic flux circulating about a particular window induce a current to flow through the spoke passing through that window and the conductive paths containing that spoke.

Preferably, the segments of the conductive paths are evenly spaced by an angle 0° where 0° equals 360°/number of segments, and the currents flowing through the segments have a sequential phase difference of 0° to achieve circular orbital motion.

Preferably, the magnetic field producing means is a magnet provided with an air gap through which lines of magnetic flux flow and in which the segments are disposed.

Preferably the magnet is shaped as a closed loop magnet and the air gap is formed as a closed loop.

Preferably, the magnet may be a permanent magnet or an electro-magnet.

Preferably, the magnet in the form of a Cockcroft ring.

DETAILED DESCRIPTION

Figure 1A:
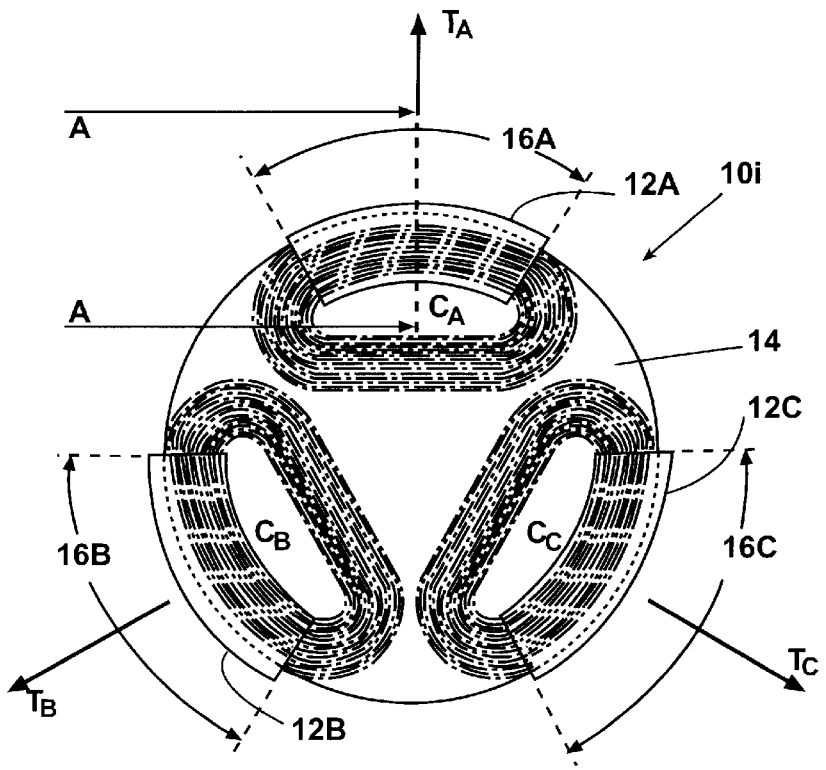
FIG. 1A is a schematic representation of the first embodiment of the electric motor.
Figure 1B:
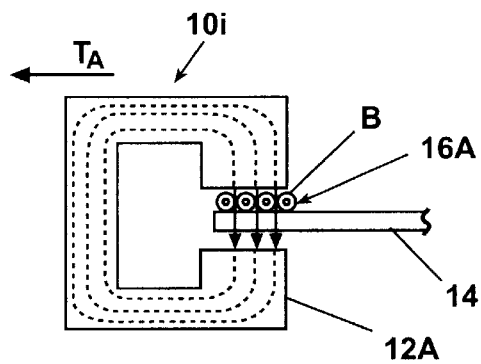
FIG. 1B is an enlarged view of section A—A of FIG. 1A.
Figure 1C:
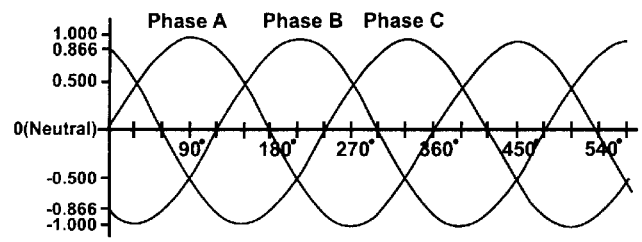
FIG. 1C is a graphical representation of a three-phase AC voltage/current supply.

Referring to FIGS. 1A and 1B, a first embodiment of the electric motor 10; includes magnetic field means in the form of three separate magnets 12A–12C (referred to in general as "magnets 12") each producing a magnetic field having lines of flux B extending in the first direction perpendicularly into tile page. A support in the form of disc 14 is provided that is capable of two-dimensional motion relative to the magnets 12 in the plane or the page. The disc 14 is provided with a minimum of two, and in this particular case three, electrically conductive paths in the form of conductor coils $C_A$, $C_B$ and $C_C$ (referred to in general as "conductive paths"; "coils"; or "paths" C).

Throughout this specification and claims the expression "the disc (or support) . . . is provided with . . . electrically conductive paths" is to be construed as meaning that either the disc (support) has attached, fixed or otherwise coupled to it electrical conductors forming the paths, as shown for example in FIGS. 1–4; or, that the disc (support) is made of an electrically conductive material and does by itself provide of constitute the electrically conductive paths as shown for example in FIGS. 5–8B.

Consider for the moment the conductor path or coil $C_A$ and its corresponding magnet 12A. The path $C_A$ as a segment 16A that extends through the magnetic field B produced by the magnet 12A in a second direction preferably, but not essentially, perpendicular to the first direction, i.e. perpendicular to the lines of flux produced by magnet 12A. If a current is caused to flow in coil $C_A$ say in the clockwise direction then the interaction of that current and magnetic field will produce a transverse thrust force TA that acts on the disc 14 via the segment 16A. The precise direction of the thrust force TA is provided by the right hand rule and thus, in this scenario will be directed in the upward direction in the plane of the page. The remaining coils or paths $C_B$ and $C_C$ likewise have corresponding segments 16B mid 16C that extend in a direction perpendicular to the lines of magnetic flux of a corresponding magnets 12B and 12C. Therefore, if electric currents are caused to flow in paths $C_B$ and $C_C$ say in the clockwise direction then similarly thrust forces TB and TC will be produced that act on the disc 14 via the respective segments 16B and 16C and in directions as dictated by the right hand rule. The segments 16A and 16B (and indeed in this instance also segment 16C) are located relative to each other so that their respective thrust forces TA and TB do not lie on the same axis or line. By having two thrust forces directed along different axes or lines, two-dimensional motions of the disc 14 can be achieved. Moreover, the path of motion of the disc 14 can be controlled by varying the magnitude and/or phase relationship of the electric currents flowing through the segments 16A–16C (referred to in general as "segments 16").

In its simplest form, consider the situation where electric current is supplied to coil $C_A$ only in the clockwise direction. Thrust force TA is produced which causes tile disc 14 to move in the direction of the thrust force. If coil $C_A$ is now de-energized and coil $C_B$. energized the disc 14 will move in a direction parallel to thrust force TB which is angularly offset by 120° from the direction of thrust force TA. If coil $C_A$ is de-energized and coil $C_C$ energized the disc 14 will move in the direction of corresponding thrust force TC which is angularly offset by a further 120° from thrust force TB. By repeating this switching process, it can be seen that the disc 14 can be caused to move in a triangular path in a plane, i.e. it can move with two-dimensional motion in a plane. A digital controller (not shown) can be used to sequentially provide DC currents to coils $C_A$–$C_C$ at various switching rates and various amplitudes for control of the motion of the disc 1A. Also, the path or motion can be modified by causing an overlap in currents supplied to the segments. For example, current can be caused to flow in both coils $C_A$ and $C_B$ simultaneously, perhaps also with modulated amplitudes.

In this embodiment, three separate coils $C_A$, $C_B$ and $C_C$ are shown. However, as is clearly apparent to produce two dimensional motion in a plane a minimum of two coils, for example $C_A$ and $C_B$, only is sufficient, provided the respective thrust forces TA and TB do not act along the same axis or line. Stated another way, what is required for a two dimensional motion is that there is a minimum of two coils relatively disposed so that when their thrust forces are acting on the disc 14 they cannot produce a zero resultant thrust force on the disc (except when both the thrust forces themselves are zero).

Rather than the triangular motion described above, the disc 14 can be caused to move with a circular orbital motion by energizing the coils $C_A$ $C_B$ and $C_C$ with AC sinusoidal currents that are 120° (electrical) out of phase with each other.

It is to be appreciated that the circular orbital motion is not a rotary motion about an axis perpendicular to the disc 14, i.e. the disc 14 does not act as a rotor in the conventional sense of the word. In the present embodiment, if each of the coils $C_A$, $C_B$, and $C_C$ were connected to different phases in the three phase sinusoidal AC current supply, of the type represented by FIG. 1C, the disc 14 would move in a circular orbital motion. This arises because the total resultant force i.e. the combination of TA, TB and TC is of constant magnitude at all times. The difference in phase between the coils $C_A$, $C_B$ and $C_C$ leads to the direction of the resultant force simply rotating about the center of (lie disc 14. This is an angular linear force, not a torque. The frequency of the motion of disc 14 is synchronous with the frequency of the AC current to the coils $C_A$, $C_B$ and $C_C$. Thus, the motion frequency of disc 14 can be varied by varying the frequency of the supply voltage/current. A non-circular orbit can be produced by providing coils $C_A$, $C_B$, and $C_C$ with currents that are other than 120° out of phase and/or of different amplitude.

In the embodiment shown in FIGS. 1A and 1B, the disc 14 is made of a material that is an electrical insulator and the coils $C_A$, $C_B$ and $C_C$ are wire coils that are fixed for example by glue or epoxy to the disc 14. The coils $C_A$, $C_B$ and $C_C$ have separate leads (not shown) that are coupled to a voltage supply (not shown). The magnets 12 have a C-shaped section as shown in FIG. 1B providing an air gap 18 through which lines of flux B extend. The segments 16 of each of the coils C are located ill the air gaps 18 of their corresponding magnets 12.

Figure 2:
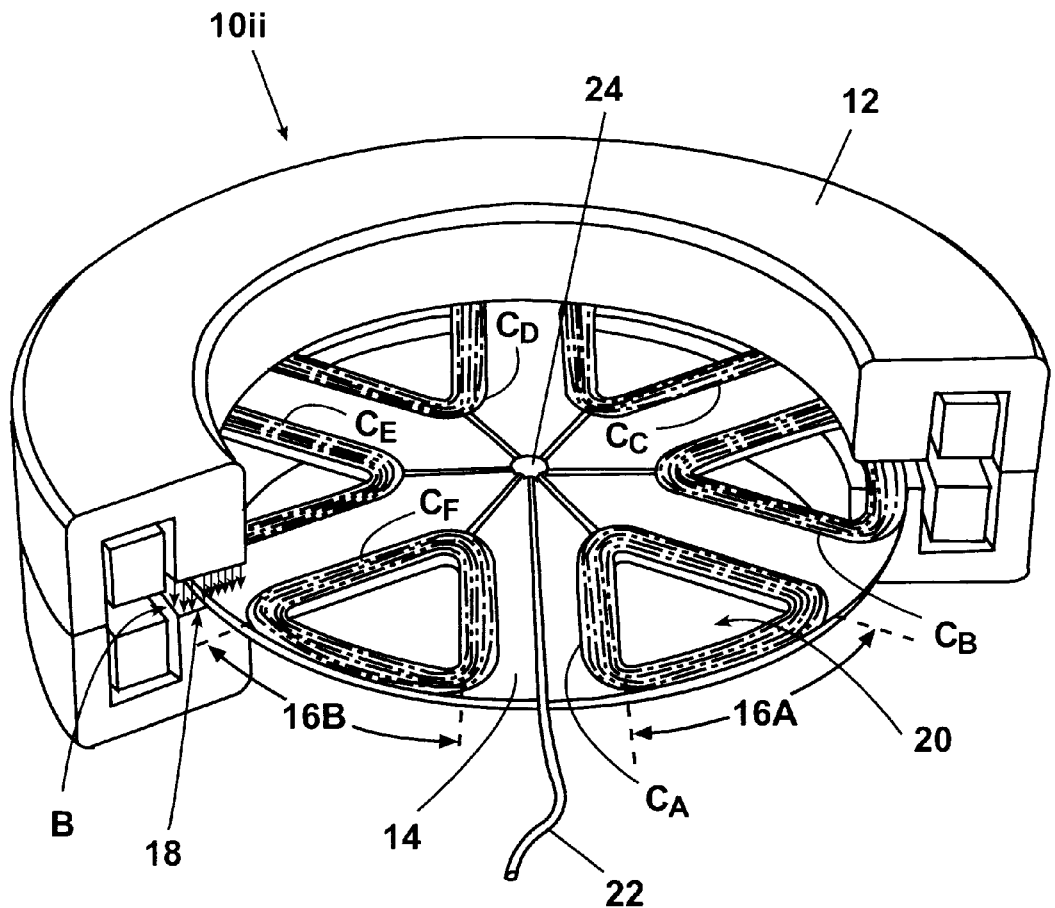
FIG. 2 is a partial cut away perspective view of a second embodiment of the electric motor.

FIG. 2 illustrates an alternate form of the motor $10_{ii}$ which differs from the embodiment shown in FIG. 1 by replacing the separate magnets 12A, 12B and 12C with a single magnet 12 in the form of a Cockcroft ring and in which the disc 14 is provided with six conductive paths or coils CA–CF. In order to reduce weight, the disc 14 is provided with six apertures or cut-outs 20 about which respective ones of conductive paths C extend. A multi-conductor cable 22 extends from a six phase power supply (not shown) to a central point 24 on the disc 14 where respective conductor pairs fan out to the coils C. The six phase is required for the coils CA–CF can be obtained from a conventional star or delta three phase power supply by tapping off the reverse polarities of each phase.

In the motor $10_{ii}$ shown in FIG. 2, each conductive path or coil C has a segment 16 that is disposed in the air gap 18 of the magnet 12. As with the previous embodiment, when current is caused to flow through the segments 16, the transverse force is created due to the interaction between the current and the magnetic flux B, the transverse force is acting on the disc 14 via the respective segments 16. It will be recognized that many different pairs of segments, (e.g. 16A, 16F; 16A, 16C; 16B, 16D etc.) are relatively located to each other so that their respective thrust forces are not parallel ill the plane of motion of the disc 14. Consequently, the disc 14 is again able to move in a two dimensional planar motion. The fact that thrust forces produced on diametrically opposed segments are parallel does not negate the existence of other thrust forces that do not act along the same axis or line to enable the generation of the two dimensional planar motion.

In order to avoid rubbing of components and reduce friction, the disc 14 may be supported on one or more resilient mounts, e.g. rubber mounts or springs so that is not in physical contact with the magnet 12.

It would be understood that if the electric machine $10_{ii}$ in FIG. 2 is completely turned over, a conventional grinding head can be attached to the disc 14 for grinding a mineral sample. The orbital motion of the disc 14 would produce the required forces to cause a puck or grinding rings within the grinding head to grind a mineral sample. However, unlike conventional pulverizing mill, the frequency of the orbital motion can be changed at will by varying the frequency of the AC supply to the coils C. Further, the actual path and/or diameter of motion can be varied from a circular orbit to any desired shape by varying the phase and/or magnitude relationship between the currents in the coils C while the machine is in motion.

Figure 3:
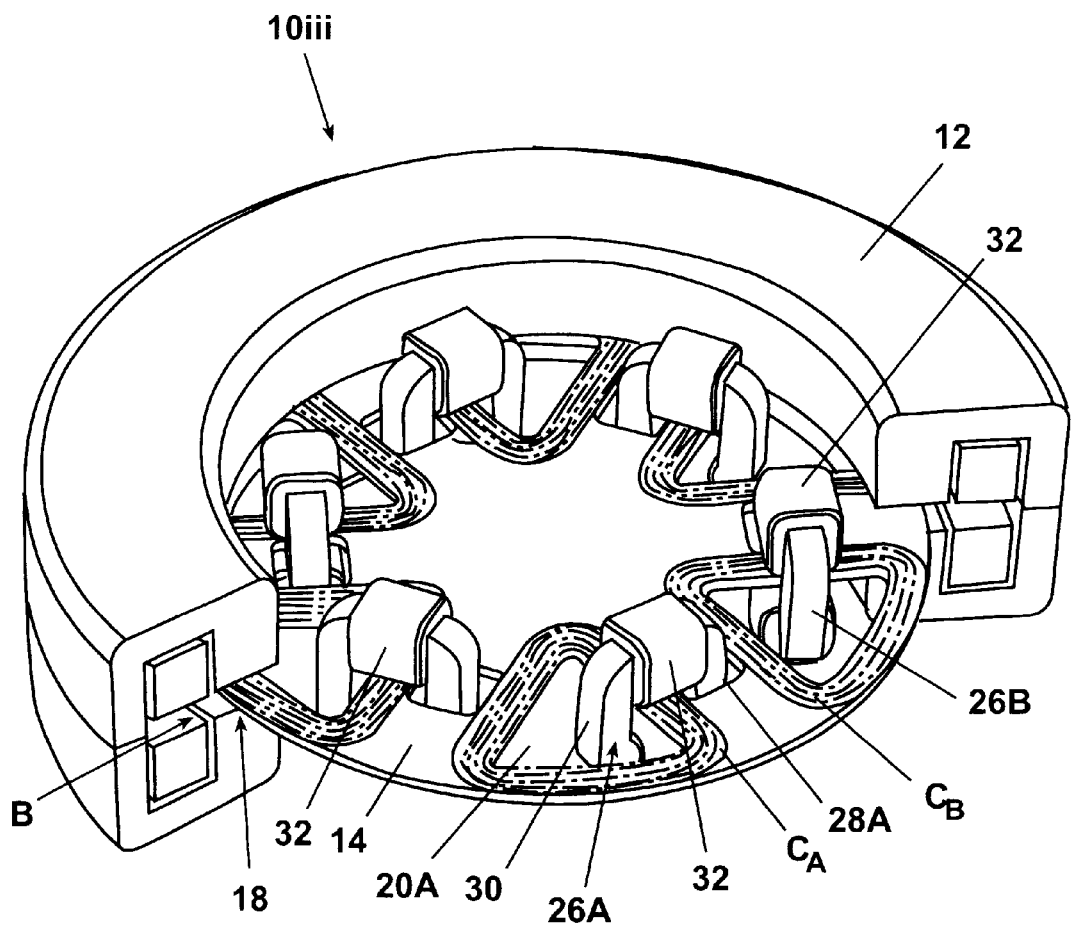
FIG. 3 is a partial cut away perspective view of a third embodiment of the electric motor.

A further embodiment of the electric motor $10_{iii}$ is shown in FIG. 3. In the electric motor $10_{iii}$ instead of each coil C being physically connected by a conductor to a current supply through multi-connector cable 22, current for each coil C is produced by electromagnetic induction using transformers 26A–26E (referred to in general as "transformers 26"). Further, the conductive paths (i.e. coils C) are now multi-turn closed loops. The disc 14 includes in addition to the apertures 20, a plurality of secondary apertures 28A–28F (hereinafter referred as "secondary apertures 28"), one secondary aperture 28 being located adjacent a corresponding primary aperture 20 with the apertures 20 and 28 being separated by a portion of the coils C extending about the particular primary aperture 20. Each transformer 26 has a core 30 and a primary winding 32. The primary winding 32 may be in the form of two physically separated though electrically connected coils located one above and one below the plane of the disc 14. The core 30 of each transformer links with one of the coils C so that coil C acts as secondary windings. This interlinking is achieved by virtue of the core 30 looping through adjacent pairs of apertures 20 and 28. It will be appreciated that a current flowing through the primary winding 32 of a transformer 26 will induce the current to flow about the linked coil C. The apertures 20 and 28, and core 30 are relatively dimensioned to ensure that the disc 14 does not impact or contact the core 30 as it moves in its two dimensional planar motion. The transformers 26 are supported separately from the disc 14 and thus do not add any inertial effects to the motion of the disc 14. By using induction to cause currents to flow through the coils C the need to have a physical cable or connection as exemplified by multiconductor cable 22 in the motor $10_{ii}$ is eliminated. This is seen as being particularly advantageous as cables or other connectors may break due to fatigue caused by motion of the disc 14 and also add weight and thus inertia to the disc 14.

Figure 4:
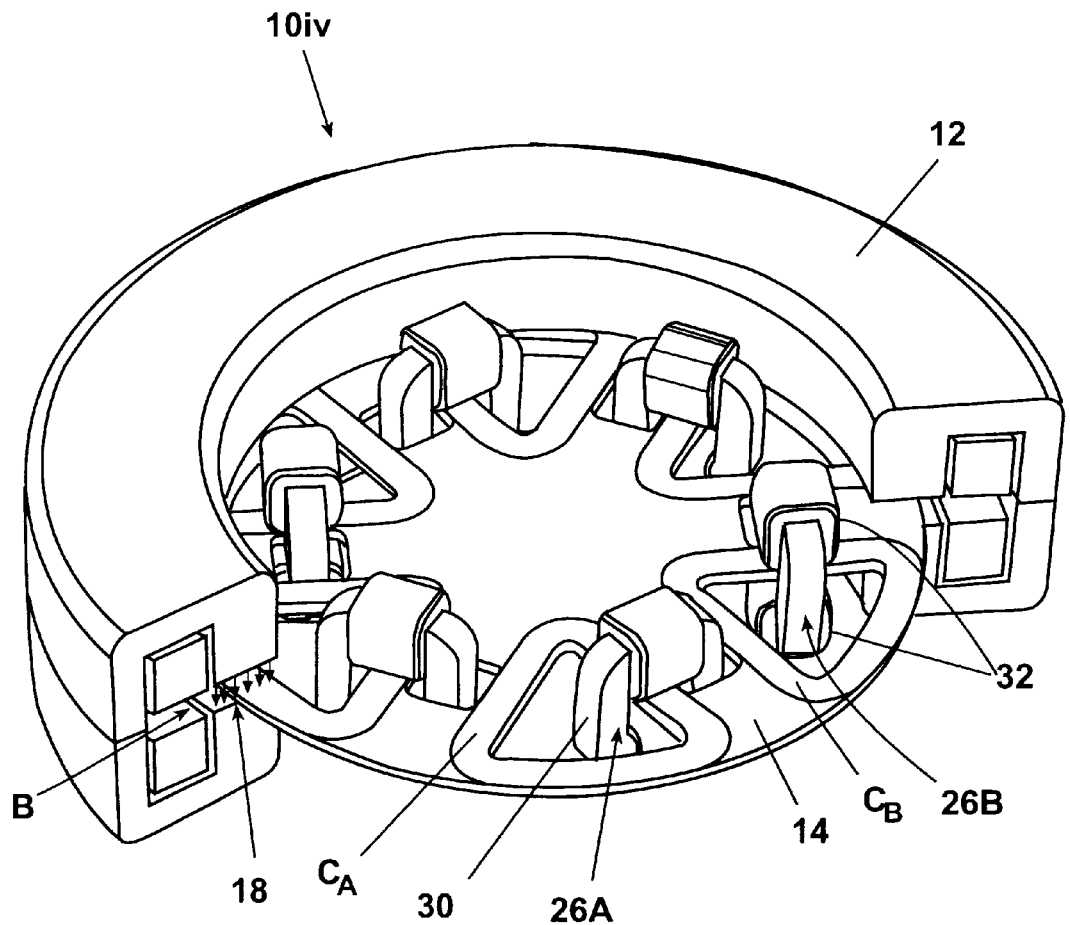
FIG. 4 is a partial cut away perspective view of a fourth embodiment of the electric motor.

FIG. 4 illustrates a further embodiment of the electric motor $10_{iv}$. This motor differs from motor $10_{iii}$ by forming the respective conductive paths C with a single turn closed loop conductor rather than having multiturn coils as previously illustrated. Replacing, a multi-turn wire coil with a single solid loop has no adverse effects. The single solid loop behaves the same as the multi-turn coil with the same total cross-sectional area, where the current in the single loop equals the current in each turn of the coil multiplied by the number of turns, thereby giving the same resultant thrust force. Again, as with the previous embodiments, the motion of the disc. 14 can be controlled by the phase and/or magnitude relationship of electric currents flowing through the segments 16 of each conductive path, i.e. conductive loop C.

Figure 5:
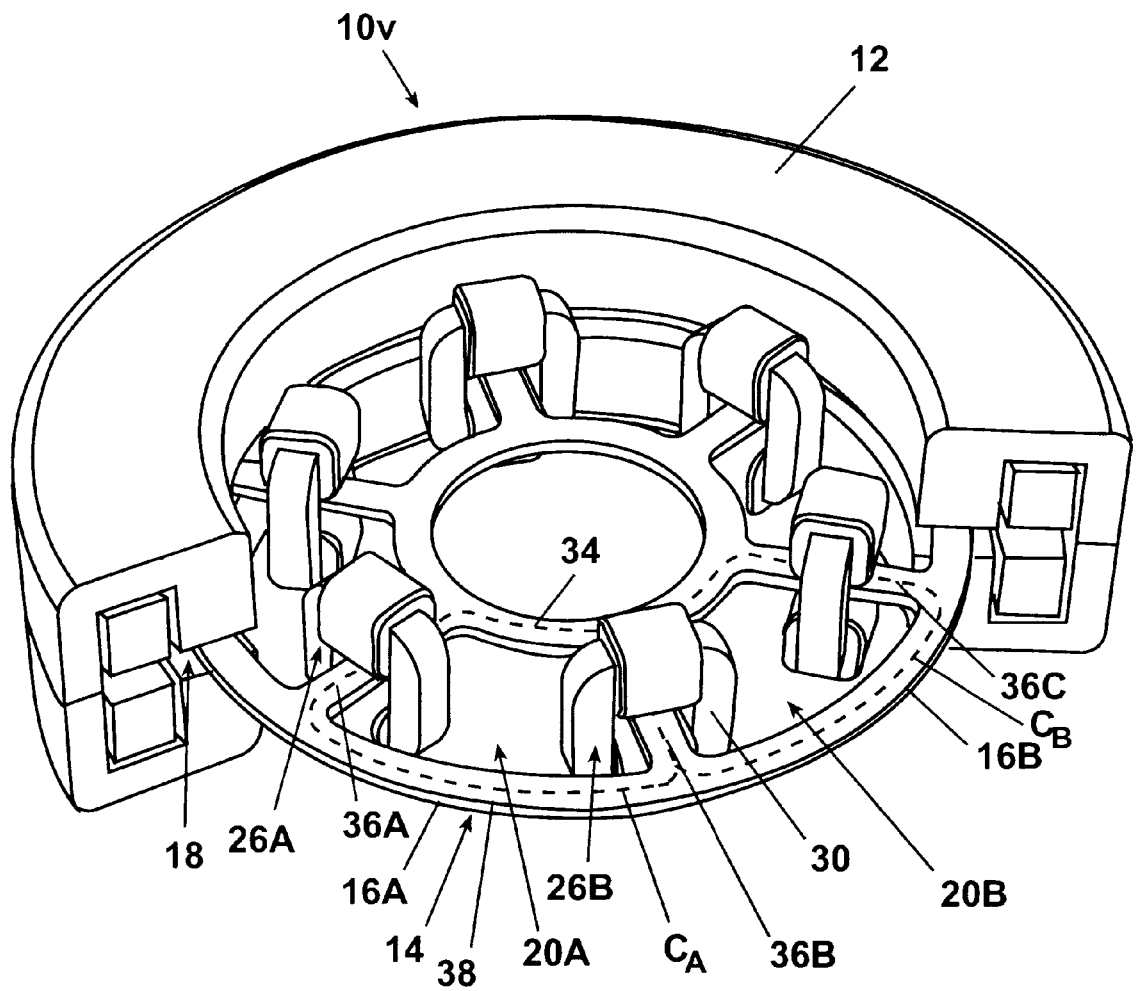
FIG. 5 is a partial cut away perspective view of a fifth embodiment of the electric motor.

FIG. 5 illustrates yet a further embodiment of the electric motor $10_v$. This is a most remarkable embodiment as the conductive paths C are electrically connected together. In the motor $10_v$, the disc 14 is now in the form of a wheel having a central hub 34, a plurality of spokes 36 extending radially outwardly from the hub 34 and an outer peripheral rim 38 joining the spokes 36. Apertures 20 similar to those of the previous embodiments are now formed between adjacent spokes 36 and the sectors of the hub 34 and rim 3 38 between the adjacent spokes 36. The disc 14 is made of an electrically conductive and most preferably non-magnetic material such as aluminum. The current paths are constituted by the parts of the disc 14 surrounding or bounding an aperture 20. For example, conductive paths CA (shown in phantom) comprises the spokes 36A and 36B and the sectors of the hub 34 and 38 between those two spokes. Conductive path $C_B$ is constituted by spokes 36B and 36C and the sectors of the hub 34 and 38 between those two spokes. The sector of the rim 38 between adjacent spokes form the segment 16 for the conductive path containing those spokes. It is apparent that adjacent conductive paths C share a common spoke, (i.e. have a common run or log). Each transformer 26 links with adjacent apertures 20 and has, passing through its core 30 one of the spokes 36. Consider for the moment transformer 26B. The core of this transformer passes through adjacent apertures 20A and 20B with the spoke 36B extending transversely through the core 30 of transformer 26B. The current induced into spoke 36B by the transformer 26B is divided between current paths CB and CA. Thus the transformer 26B, when energized, induces a current to flow through both paths CA and CB. In like fashion. each of the transformers 26 can induce the current to flow in respective adjacent conductive paths C. The state of the transformers will determine the current division between adjacent conductive paths. Hence, the sectors of the rim 38 between adjacent spokes 36 and the currents flowing through them act in substance the same as the segments 16 in the motors $10_i$–$10_{iv}$.

Figure 6:
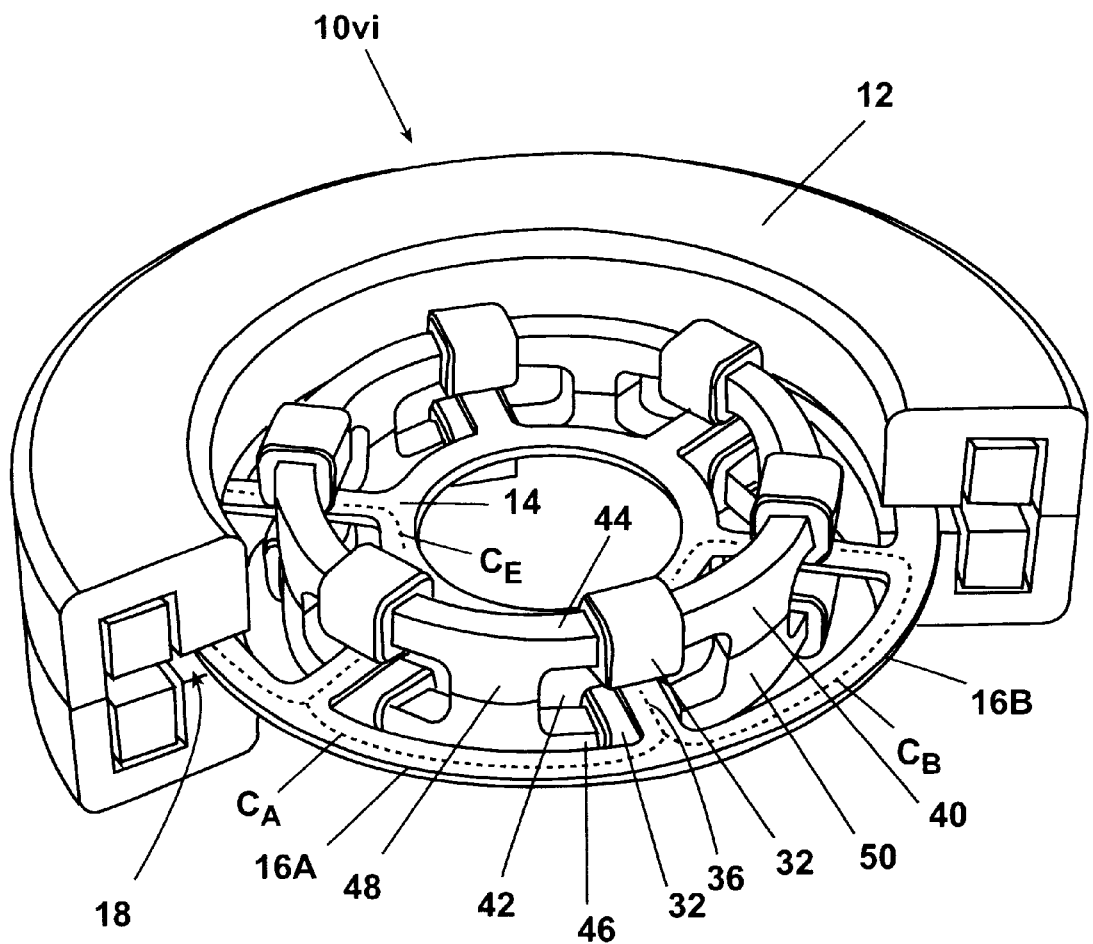
FIG. 6 is a partial cut away perspective view of a sixth embodiment of the electric motor.

FIG. 6 illustrates a further embodiment of the electric motor $10_{vi}$. This motor differs from electric motor $10_v$ by replacing the separate transformers 26 with a multi-phase toroid shaped transformer dubbed a "transoid" 40. The transoid 40 can be viewed as a ring of magnetically permeable material formed with a number of windows 42 and arranged so that separate conductive spokes 36 pass through individual different windows 42. Each window 42 is bound by opposed branches 44 and 46 that extend in the plane of the disc 14 and opposed legs 48 and 50 that extend perpendicularly to and join the opposed branches 44 and 46. Primary windings 32 are placed on each of the opposed branches 44 and 46 for every window 42. (Although it should be understood that primary winding can be placed anywhere within the window i.e., 44, 46, 48, 50 with one or more primary windings being utilized in various embodiments). Primary windings 32 are coupled to a six phase current supply in a manner so that the windings 32 for each window 42 are coupled to a different phase. Current flowing through the primary windings 32 sets up lines of magnetic flux circulating about the Windows 42. This flux in turn induces the current to flow in the spoke 36 passing through that window 42 and the conductive path C to which that spoke 36 relates. It will be recognized that the majority of the flux generated about adjacent windows 42 will circulate through the common adjacent leg 48.

In comparison with the electric motor $10_v$ shown in FIG. 5, the use of the transoid 40 makes more efficient use of its core because flux is shared from one or more primary coils. That is, magnetic flux induced by currents in primary coils about adjacent windows 42 can be shared through the common leg 48. Indeed oven more distant primary coils can contribute to the flux in that leg.

Figure 7:
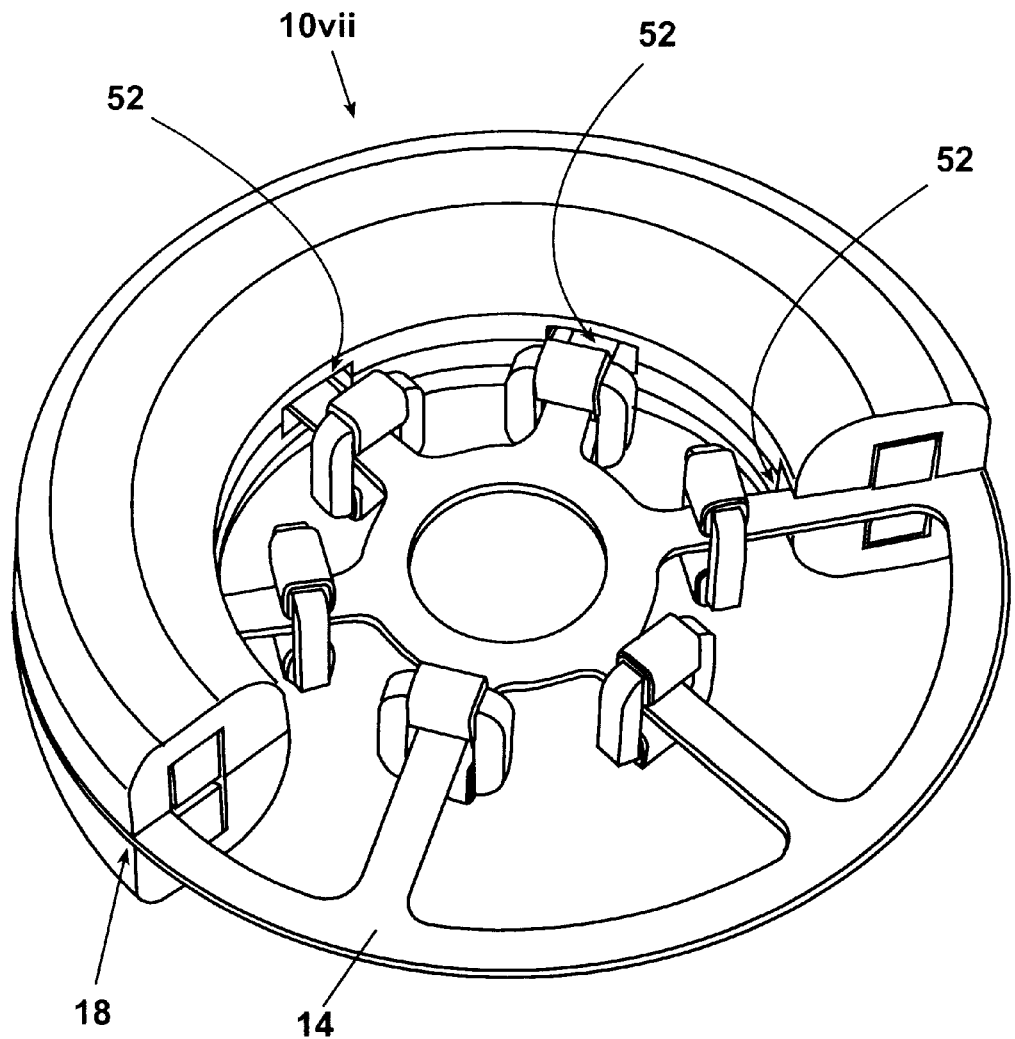
FIG. 7 is a partial cut away perspective view of a seventh embodiment of the electric motor.
Figure 8B:
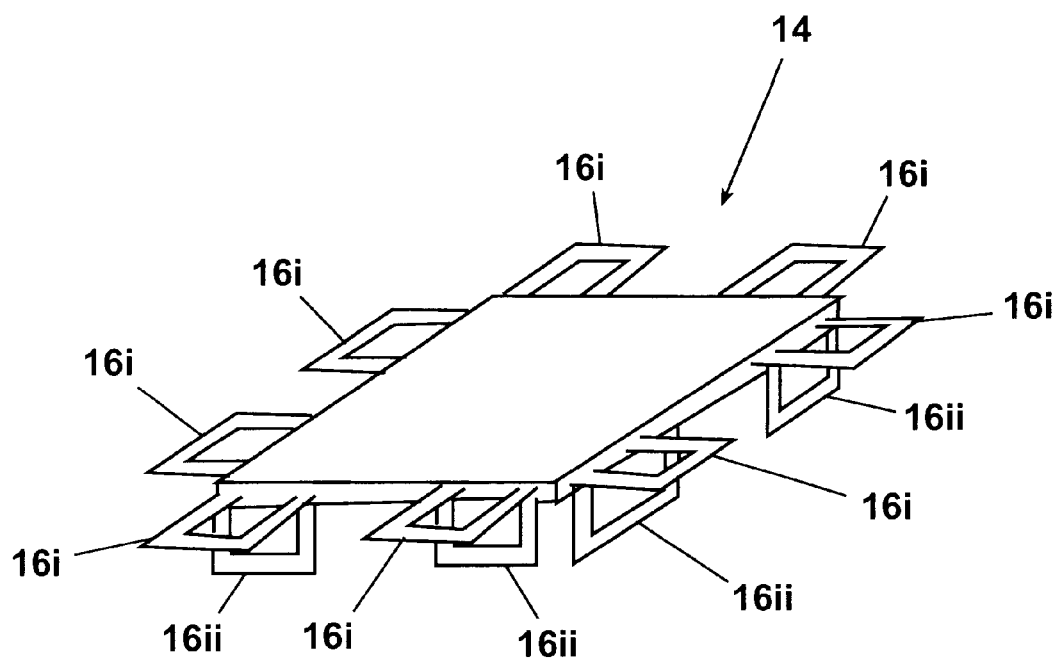
FIG. 8A is a partial cut away perspective view of a eighth embodiment of the electric motor; and, FIG. 8B is a perspective view of a support incorporated in the embodiment shown in FIG. 8A.
Figure 8A:
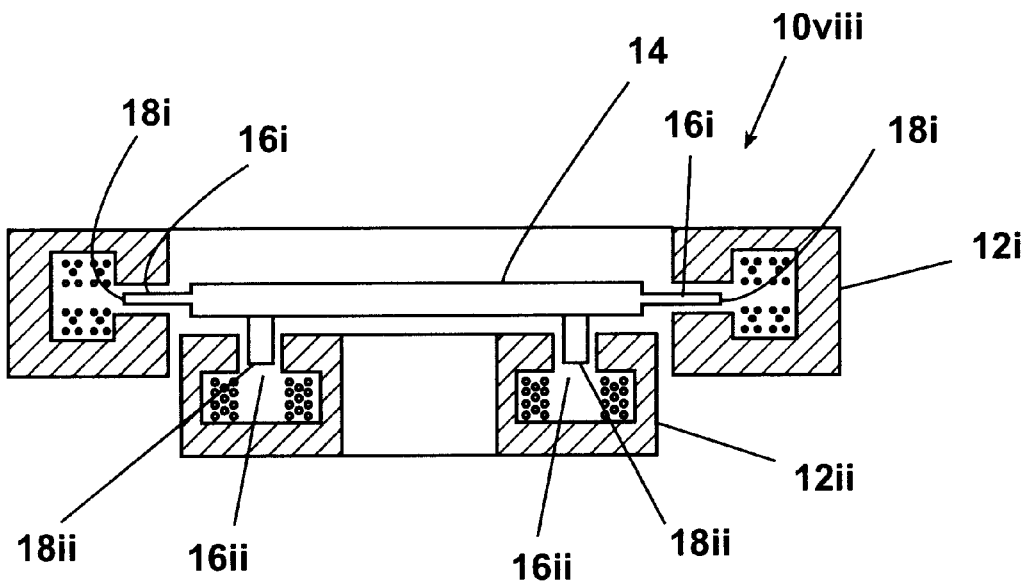

A further embodiment of electric motor $10_{vii}$ is shown in FIG. 7. This embodiment differs from the motor $10_v$ shown in FIG. 5 in the configuration of the Cockcroft ring 12. In this embodiment, the air gap 18 of the Cockcroft ring is on the outer circumferential surface of the Cockcroft ring rather than on the inside surface as shown in FIG. 5. Additionally, a plurality of radially extending slots 52 are formed in the Cockcroft ring 12 through which the spokes 36 can pass. The slots 52 must be sufficiently wide to not inhibit the motion of the disc 14.

In the embodiments of the electric motor $10_{ii}$–$10_{vii}$ there are six segments 16 through which current flows to produce respective transverse forces that act on the disc 14. However, this can be increased to any number. Conveniently however the number of segments 16 will be related to the number of different phases available from a power supply used for driving the motor 10. For example, the motor 10 can be provided with 12 segment 16 through which current can flow by use of a 12 phase supply. In this instance, therefore, transformers are used to induce currents to flow in each segments, there will be required either 12 separate transformers 26 as shown in FIGS. 4, 5, and 7 or alternately a twelve window transoid 40.

In the afore-described embodiments, the motion of the support 14 is a two dimensional motion in one plane. However, motion in a second or more nonparallel planes can also be easily achieved by the addition and/or location of further segments 16 in the second or additional planes and, further means for producing magnetic fields perpendicular to the currents flowing through those additional segments. An example of this is shown in the motor $10_{viii}$ in FIGS. 8A and 8B in which the support 14 has one set of segments $16_i$ and a first plane (coincident with the plane of the support 14) and a second set of segments $16_{ii}$ that extend in a plane perpendicular to the plane of the support 14. The motor $10_{viii}$ as first Cockcroft $12_{ii}$ having an air gap $18_{ii}$ in which the segments $16_i$ reside, and a second Cockcroft ring $12_{ii}$ having an air gap $18_{ii}$ in which the second set of segments $16_{ii}$ reside. Thus, in this embodiment, the support 14 can move with a combined two dimensional motion in the plane of the support 14 and an up and down motion in a second plane perpendicular to the plane of the support 14. Thus, in effect, in this embodiment, the support 14 can float in space by action of the thrust forces generated by the interaction of the current flowing through segments $16_{ii}$ and the magnetic field in the Cockcroft ring $12_{ii}$. As is apparent from FIG. 8B the support 14 need not be circular in shape but can be square (as in FIG. 8B) or any other required/desired shape. For the sake of clarity the means for supplying current 1.0 the segments $16_i$, $16_{ii}$ have not been shown. The currents may be provided by direct electrical connection to a current source as in the embodiments $10_i$ and $10_{ii}$ or via induction as in embodiments $10_{iii}$ to $10_{vii}$.

From the above description it will be apparent that embodiments of the present invention have numerous benefits over traditional machines used for generating vibratory or orbital motion. Clearly, as the motion of the disc 14 is non rotational. there is no need for bearings, lip seals, gear boxes, eccentric weights or cranks. In addition, the inertial aspects of rotation, such as a time to accelerate to speed and gyroscopic effects are irrelevant. In the embodiments of the machine $10_{ii}$–$10_{vii}$ induction is used to cause current to flow in the segments 16 and thus commutators, brushes, and flexible electric cables arc not required. It will also be apparent that the only moving part of the machine 10 is either the support 14 or the magnetic field means 12. When the support 14 itself that carries the electric current as shown in embodiments $10_v$–$10_{vii}$ this 14 can be made from one piece only say by punching or by casting. In these embodiments the disc 14 must be made from an electrically conductive material and most preferably a non magnetic material such as aluminum copper or stainless steel. When the machine 10 is used to generate an orbital motion from imparting to another object (for example a grinding head) there can be a direct mechanical coupling by use of bolts or screws.

The motor 10 is a force driven machine and force it delivers is essentially unaltered by its movement. There is a small degree of back EMF evident, however the tests indicate that this is almost negligible, especially when compared with conventional rotating motors. As such, the motor 10 is able to deliver full force regardless of whether the disc 14 is moving or not. For this reason, current drawn by the motor 10 is relatively unaffected by the motion of the disc 14. This enables the motion of the disc 14 to be resisted or even stalled with negligible increase in current draw and therefore negligible increase in heat build-up.

In the conventional mechanical orbital or vibratory machines, the orbital or vibratory motion is usually fixed with no variation possible without stopping the machine to make suitable adjustments. With the motor 10$i$ the orbit diameter is proportional to the force applied, which in turn is proportional to the currents supplied. Therefore the orbit diameter can be controlled by varying the supply voltage that regulates the current in the segment 16. This results in a linear control with instant response available, independent of any other variable. As previously mentioned, the orbit frequency is synchronous with the frequency of the supply voltage, so that orbit frequency can be varied by varying the supply frequency. The motor 10 also allows one to avoid undesirable harmonics. A common problem with conventional drive systems is that as the motor builds up speed it can pass through frequency bands coinciding with the actual harmonic frequencies of various attached mechanisms that can then lead to uncontrolled resonance that can destroy the machine or parts thereof. The disc 14 however is able to start at any desired frequency and does not need to ramp tip front zero speed to a required speed. In this way any undesired harmonics can be avoided. Particularly, the motor 10 can be started at the required frequency with a zero voltage (and hence zero orbit diameter) and then the voltage supply can be increased until the desired orbit diameter is reached.

If no control over the orbit diameter or frequency is required, the motor 10 can be connected straight to a mains supply so that the frequency will be fixed to the mains frequency. Nevertheless, full control is not difficult or costly to achieve. Existing motor controllers, which utilize relatively simple electronics with low computing requirements can be adapted to suit the motor 10. Because voltage supplies can be controlled electronically, the motor 10 can be computer driven. This enables preset software program for safety features to be built into the supply controller allowing its operation to be reprogrammed at any time. The addition of feedback sensors can allow various automatic features such as collision protection. When the disc 14 is mounted on rubber supports, it can be considered as a springmass system. As such, it will have a harmonic or resonance frequency at which very little energy is required to maintain orbital motion at that frequency. If the machine 10 is only required to run at one frequency, the stiffness of the rubber supports can be chosen such that resonance coincides with this frequency to reduce the power losses and hence improve the machines efficiency.

While the description of the preferred embodiments mainly describes the disc 14 as moving in an orbit, depending on the capabilities of the controller for the supply, i.e. the ability to vary phase relationships and amplitudes of the supply current, the disc 14 can produce any shaped motion within the boundaries of its maximum orbit diameter.

Embodiments of the motor 10 can be used in many different applications such as pulverizing mills as previously described, cone crushers, sieve shakers, vibrating screens, vibratory feeders, stirrers and mixers, orbital sanders, orbital cutting heads.

Further in the described embodiments the motion of the support/disc 14 relative to the magnetic field means 12 is achieved by having the support/disc 14 movable and the magnetic field means 12 fixed. However this can be reversed so that the support/disc 14 is fixed or stationary and the magnetic field means 12 moves. This may be particularly useful when it is required to impart and maintain, for example a vibratory motion to a large inertial mass. Also, it is preferred that the segments 16 extend through the magnetic field B at right angles to maximize the resultant thrust force. Clearly embodiments of the invention can be constructed where the segments 16 are not at right angles, though they must have some component of their direction at right angles to the field B to produce a thrust force.

All modifications and variations as would be apparent to those skilled in the arts are deemed to be within the scope of the present invention the nature of which is to be determined from the above description and following claims.

What is claimed is:

1. An electric motor including:
   a magnetic field means for producing a magnetic field having lines of flux extending in a first direction;
   a support capable of at least two dimensional motion in a plane relative to the magnetic field means and provided with a minimum of two electrically conductive paths, each path having a segment that extends through the magnetic field in a second direction so that interaction of an electric current flowing through a particular segment and the magnetic field produces a thrust force acting on the support via that segment;
   a first one of said segments located relative to a second one of said segments so that their respective thrust forces do not lie on the same axis; wherein the direction and magnitude of the respective thrust forces and thus the motion of the support relative to the magnetic field means can be controlled by varying the magnitude and/or phase relationship of electric currents flowing through the segments.

2. An electric motor according to claim 1, wherein the support is made of an electrically conductive material and is provided with a plurality of apertures disposed inboard of an outer peripheral edge of the support wherein the electrically conductive paths are constituted by the portions of the support that extend about the apertures.

3. An electric motor according to claim 2 wherein the support is in the form of a wheel having a central hub, spokes extending radially outwardly from the hub and an outer rim joining the spokes, wherein each aperture is defined by the space formed between adjacent spokes and sectors of the hub and rim between which adjacent spokes extend, and each conductive path comprises a pair of adjacent spokes and the sectors of the hub and rim between which the pair of adjacent spokes extend so that adjacent conductive paths share a common spoke.

4. An electric motor according to claim 3 further including induction means for inducing an electric current to flow through the electrically conductive paths.

5. An electric motor according to claim 4, wherein the induction means is supported separately from the support.

6. An electric motor according to claim 5 wherein the inductions means comprises a plurality of transformers each having a primary coil and a core about which the primary coil winds, and wherein the core of each transformer interlinks with adjacent apertures so that an electric current flow in the primary coil of a transformer can induce an electric current to flow the electrically conductive paths about the corresponding adjacent apertures.

7. An electric motor according to claim 5 wherein the induction means includes:
   a transformer having a core formed into a closed loop and provided with a plurality of windows through which respective spokes of the support pass, each window bound by opposed branches of the core that extend in the same plane as the support and opposed pairs of legs of the core that extend in a plane perpendicular to the support; and
   a plurality of primary coils, a primary coil wound about at least one of the branches of the core of each window;
   whereby in use, when an alternating current is caused to flow through the primary coils lines of magnetic flux are created that circulate about the windows in the core, the majority of the flux being shared in legs of the core between adjacent windows, and wherein said lines of magnetic flux circulating about a particular window induce a current to flow through the spoke passing through that window and the conductive paths containing that spoke.

* * * * *